US012597202B2

(12) United States Patent
Aseev

(10) Patent No.: US 12,597,202 B2
(45) Date of Patent: Apr. 7, 2026

(54) GEOLOGICALLY MEANINGFUL SUBSURFACE MODEL GENERATION BASED ON A TEXT DESCRIPTION

(71) Applicant: Schlumberger Technology Corporation, Sugar Land, TX (US)

(72) Inventor: Anatoly Aseev, Menlo Park, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 139 days.

(21) Appl. No.: 18/588,935

(22) Filed: Feb. 27, 2024

(65) Prior Publication Data

US 2025/0272916 A1 Aug. 28, 2025

(51) Int. Cl.
*G06T 17/05* (2011.01)
*G01V 1/34* (2006.01)

(52) U.S. Cl.
CPC .............. *G06T 17/05* (2013.01); *G01V 1/345* (2013.01)

(58) Field of Classification Search
None
See application file for complete search history.

(56) References Cited

U.S. PATENT DOCUMENTS

| | | | |
|---|---|---|---|
| 2019/0064378 A1* | 2/2019 | Liu | G06N 3/08 |
| 2020/0184374 A1* | 6/2020 | Liu | G06F 16/2246 |
| 2022/0291406 A1* | 9/2022 | Almarhoon | G01V 1/302 |
| 2024/0161462 A1* | 5/2024 | Gandelsman | G06T 5/60 |
| 2024/0289559 A1* | 8/2024 | Gajek | G06F 40/40 |

FOREIGN PATENT DOCUMENTS

WO 2025136438 A1 6/2025

OTHER PUBLICATIONS

Wellmann et al., "PyNoddy 1.0: An Experimental Platform for Automated 3-D Kinematic and Potential Field Modelling", Mar. 10, 2016, Geoscientific Model Development, vol. 9, No. 3, pp. 1019-1035 (Year: 2016).*
Beltagy, I. et al., "SciBERT: A Pretrained Language Model for Scientific Text", arxiv labs, 2019, 6 Pages.
Patil, S. et al., "Stable Diffusion with Diffusers", Hugging Face, retrieved from https://huggingface.co/blog/stable_diffusion, Aug. 22, 2022, 22 pages.
Radford, A. et al., "Learning Transferable Visual Models From Natural Language Supervision", Proceedings of the 38th International Conference on Machine Learning, 2021, 16 Pages.
Ramesh, A. et al., "Hierarchical Text-Conditional Image Generation with CLIP Latents", arxiv Labs, Apr. 13, 2022, 27 Pages.
Song, J. et al., "Denoising Diffusion Implicit Models", arxiv labs, Oct. 5, 2020, 22 Pages.

* cited by examiner

*Primary Examiner* — Kent W Chang
*Assistant Examiner* — Jonathan M Cofino
(74) *Attorney, Agent, or Firm* — Kyle R. Miiller

(57) ABSTRACT

A method, system, and computer program product are provided for generating a subsurface model by an image generating machine learning model (MLM). A text prompt is received describing a subsurface geological feature. A text encoder encodes the text prompt into a text embedding. The text embedding is processed by the image generating MLM, specifically trained on pairs of text descriptions and subsurface models, to generate subsurface models from text. The image generating MLM outputs a subsurface model comprising the subsurface geological feature that corresponds to the text prompt.

23 Claims, 7 Drawing Sheets

Computing
System
700
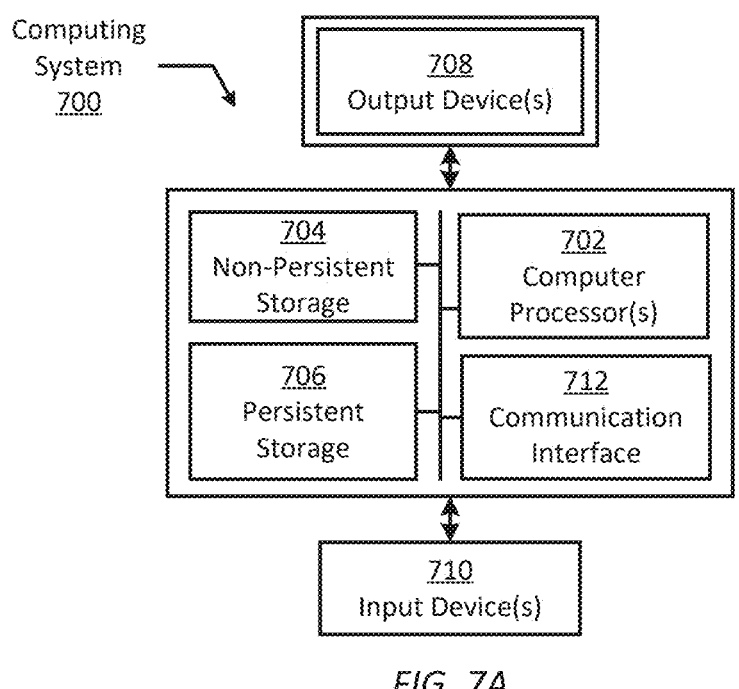
*FIG. 7A*
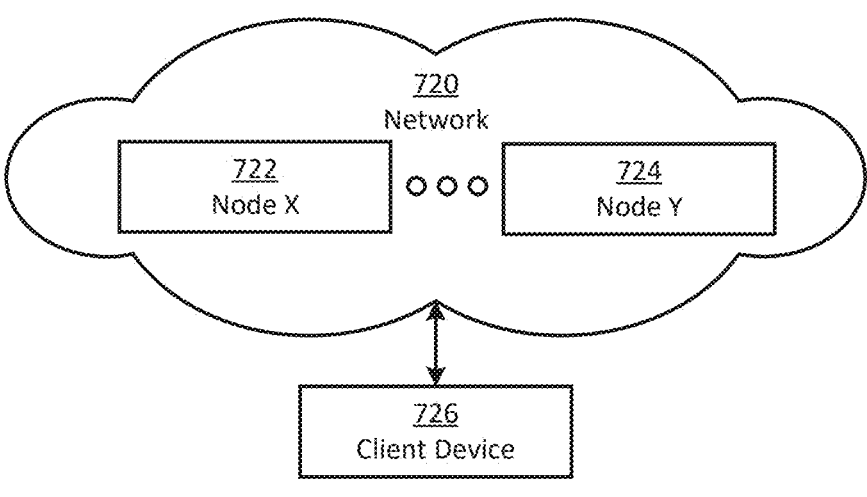
*FIG. 7B*
*FIG. 7*

GEOLOGICALLY MEANINGFUL SUBSURFACE MODEL GENERATION BASED ON A TEXT DESCRIPTION

BACKGROUND

In recent years, generative models capable of creating visual content from textual descriptions have emerged. Generative models can generate new images by understanding and combining different objects in ways that are semantically coherent. Generally, generative models are only used in the visual arts. Standard text-to-image models are unable to generalize well to the subsurface domain, where the distribution of data and semantic understanding are vastly different. Geological models should not just be visually accurate but also exhibit an understanding of geological structures, processes, and semantics. The highly specialized nature of seismic imagery fundamentally differs from the general imagery on which the general-purpose text-to-image models are trained. Moreover, general-purpose text-to-image models are not trained to oversee the stochastic and probabilistic nature of geological data, leading to a gap in their ability to produce geologically realistic models.

SUMMARY

Geologically meaningful subsurface model generation is directed to a method, computer system, and computer program product, and for generating a subsurface model by an image generating machine learning model (MLM). In one embodiment, a method includes receiving a text prompt describing a subsurface geological feature. The method further includes encoding, by a text encoder, the text prompt into a text embedding. The method additionally includes processing the text embedding by image generating MLM specifically trained on pairs of text descriptions and subsurface models to generate subsurface models from text. The method also includes outputting, by the image generating MLM, a subsurface model comprising the subsurface geological feature that corresponds to the text prompt.

Other aspects of the technology will be apparent from the following description and the appended claims.

BRIEF DESCRIPTION OF DRAWINGS

FIGS. 7A and 7B show a computing system in accordance with one or more embodiments.

Like elements in the various figures are denoted by like reference numerals for consistency.

DETAILED DESCRIPTION

In general, embodiments are directed to integrating of text-to-image machine learning technologies into the subsurface geological domain for geological modeling and analysis. Leveraging multi-modal foundation models, the system allows for the generation of geologically realistic basin, reservoir, and seismic models from concise textual descriptions provided by domain experts. The system enables the creation of unlimited, detailed subsurface models that are visually accurate and semantically plausible.

By training on a comprehensive dataset of text-model pairs, the system learns to recognize and generate complex geological structures, such as faults and folds, from text prompts. When incorporated into client software, the system empowers geoscientists to quickly iterate and refine subsurface models facilitating better decision-making in exploration and production. Additionally, the system opens up new possibilities for training and simulation, where users can generate diverse training data sets or automatically describe seismic data in scientific terms. The synthetic dataset, which includes kinematically consistent geologic two-dimensional (2D) models, causes a trained machine learning model to produce a wide range of subsurface images that are structurally accurate and account for geological variations such as noise and frequency.

Figure 1:
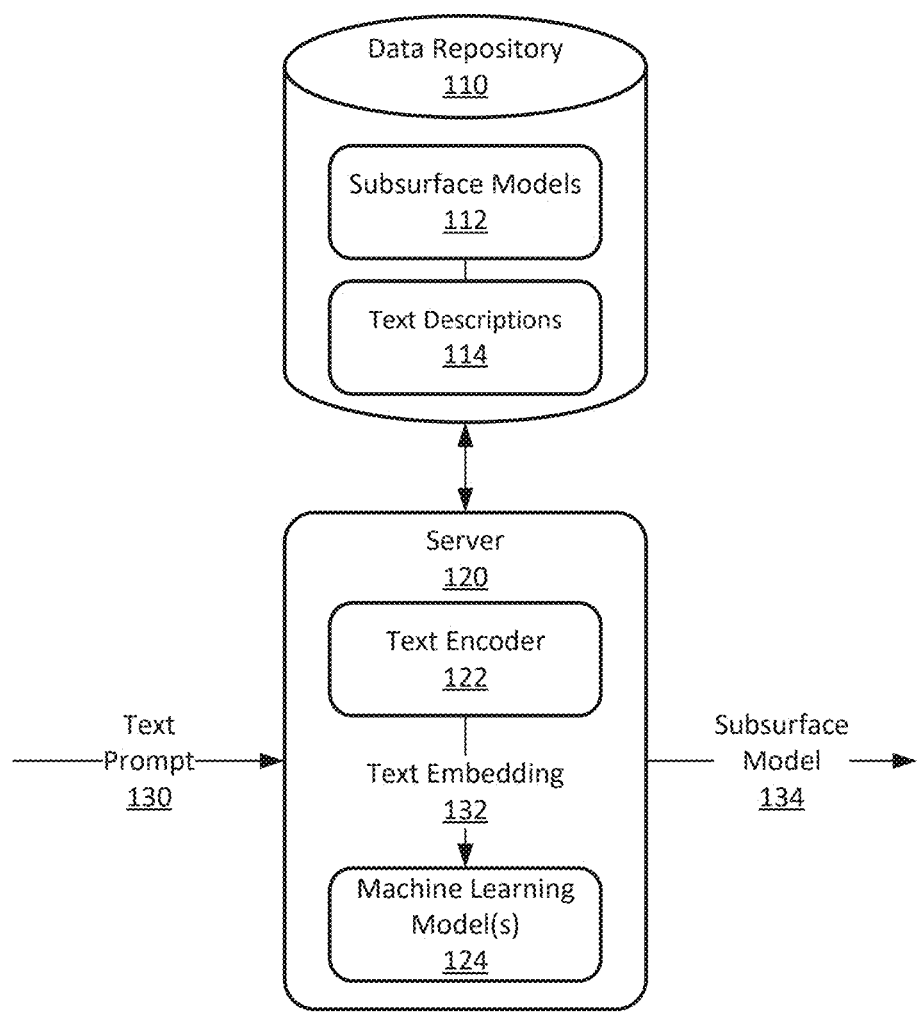
FIG. 1 shows a block diagram for a subsurface model generation system, in accordance with one or more embodiments.

Turning to FIG. 1, a block diagram for a subsurface model generation system shown according to illustrative embodiments. The system of FIG. 1 represents a high-level architecture for a system that generates subsurface geological models from text prompts. System of FIG. 1 includes one or more components. As shown, the system includes data repository (110) and server (120).

In one or more embodiments of the disclosure, the data repository (110) is any type of storage unit and/or device (e.g., a file system, database, data structure, or any other storage mechanism) for storing data. Further, the data repository (110) may include multiple different, potentially heterogeneous, storage units and/or devices.

The data repository (110) stores the data used by the machine learning model(s) (124). This data includes subsurface models (112) and text descriptions (114)

Subsurface models (112) are digital representations of geological features and strata beneath the Earth's surface. The subsurface models are multi-dimensional datasets that encapsulate various geophysical and geological properties and features, such as stratigraphic layers, fault systems, fold architectures, and other subsurface anomalies. The subsurface models (112) can be expressed in different formats. For example, the different formats may include a 2D cross-sectional images, 3D volumetric data, or even higher-dimensional arrays when including properties like temporal changes or multiple physical attributes (e.g., acoustic impedance, density, porosity). The subsurface models can be stored in a format suitable for machine learning, such as images, voxel grids, or 3D models. The subsurface models function as the "ground truth" against which the machine learning algorithms learn to generate new models from textual descriptions.

Subsurface models (112) can be generated using computational geological modeling tools that simulate the Earth's layering and structural deformations over geological time, such as PyNoddy. PyNoddy is an open-source Python tool for kinematic forward modeling of geological structures. By defining a sequence of geological events, such as the deposition of different rock layers, folding, faulting, and erosion, PyNoddy creates realistic 3D models of the subsurface for a different geological scenario. For example, subsurface models may be generated by interpolating sensor data captured from various sensors that capture seismic data.

Text descriptions (114) are accompanying textual information that describes the subsurface models (112). The text descriptions (114) can be viewed as a structured dataset where each entry is a narrative that provides a semantic representation of a geological scenario. The text descriptions (114) can be annotations, labels, or detailed descriptions manually crafted by geoscientists or extracted from scientific texts, research papers, or geological surveys.

The text descriptions (114) articulate the characteristics and attributes of subsurface geological features. These narratives may include terminology specific to geology, such as the types of stratigraphic sequences, the nature of faulting, the style of folding, the presence of particular mineral deposits, or the characteristics of seismic signatures. For example, one of text descriptions (114) could be, "A sedimentary sequence with alternating layers of shale and sandstone intersected by a high-angle reverse fault and overprinted by a synclinal fold." The text description labels the layers of rock present as well as the structural interactions between the layers.

The server (120) acts as the central processing unit of the system. The server can be a physical server, a virtual machine, or a containerized environment running on a cloud platform like Amazon EC2 or Google Compute Engine. The server (120) manages the workflow of receiving text prompts (130), processing those prompts, and generating the subsurface model (134). The server (120) may use software stacks such as Python, Java, and/or C++, as well as frameworks such as TensorFlow or PyTorch for the machine learning aspects.

Text prompt (130) is the input given by a user or another system. The prompt may be in plain text format containing a description of the desired subsurface model and entered through a user interface, an application programming interface (API) call, or a command line interface. The text prompt (130) may be a natural language statement that describes geological features or events.

The text encoder (122) is a software component for converting text prompts (130) into text embeddings (132). The text encoder (122) may leverage natural language processing (NLP) libraries such as NLTK or spaCy. The text encoder (122) may utilize pre-trained models provided by BERT, GPT, or other transformer-based architectures from libraries like Hugging Face's Transformers.

Text embedding (132) is the output from the text encoder (122). The embeddings are high-dimensional vectors that capture the semantic meaning of the text prompts (130), represented as a vector (or array) of numbers. The embedding is a data structure, such as a one-dimensional array or a tensor. The format and length of the embedding is consistent with the input format of the machine learning model(s) (124).

Machine learning model(s) (124) is one or more machine learning models that take the text embeddings and generate the corresponding subsurface models. The machine learning model(s) (124) may be implemented using deep learning frameworks such as TensorFlow or PyTorch. The machine learning models may be convolutional neural networks (CNNs) for image-like data, recurrent neural networks (RNNs) for sequential data, or a custom architecture suited for the specific task. The machine learning models could be trained on graphic processing units (GPUs) or tensor processing units (TPUs) for performance optimization.

Subsurface model (134) is the final model of the subsurface that is output from the system generated based on the text prompt. The subsurface model (134) is the visual or data representation of the geological features as described by the input text prompt. The subsurface model (134) could be in various formats suitable for different applications, like a 3D model file (e.g., STL or OBJ), a raster file for 2D representations, or a data structure that can be visualized and interpreted by geological software.

Figure 2:
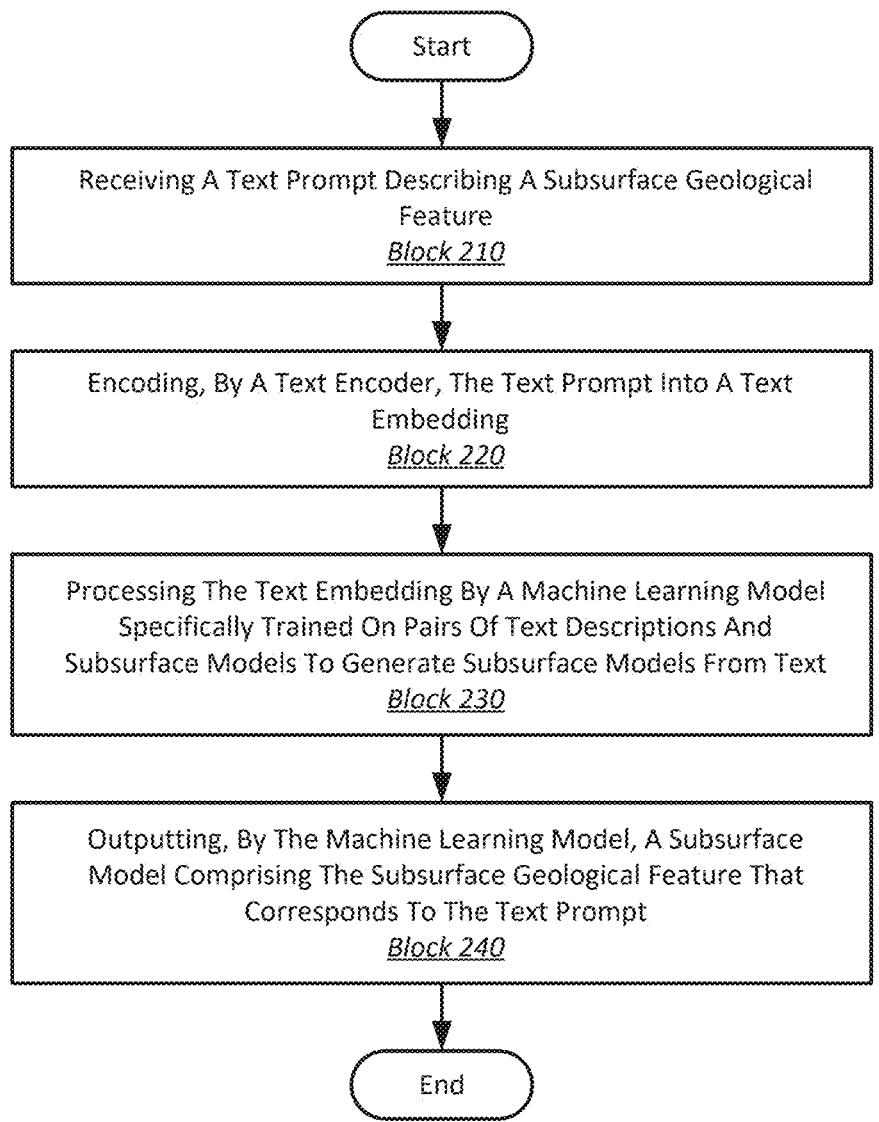
FIG. 2 shows a process for generating a subsurface model by an image generating machine learning model (MLM) in accordance with one or more embodiments.

Turning now to FIG. 2, a process for generating a subsurface model by an image generating machine learning model (MLM) is shown according to illustrative embodiments. The process of FIG. 2 can be implemented in the one or more components illustrated in FIG. 1.

At block 210, a text prompt is received describing a subsurface geological feature. The text prompt can be text prompt (130) of FIG. 1 including a natural language description of specific geological terminology, such as the type of rock layers, structural formations, or processes (e.g., "A sedimentary sequence with a reverse fault and synclinal fold"). The input may be captured via a user interface in a web application or desktop software, where the user types or pastes the description. The input may also come from an application programming interface (API) endpoint where the text prompt is sent as a part of a request payload, formatted in Javascript Object Notation (JSON) or extensible Markup Language (XML).

At block 220, the text prompt is encoded, by a text encoder, into a text embedding. The text prompt received is then processed by the text encoder, which translates the descriptive language into the text embedding. The text encoder, which can be text encoder (122) of FIG. 1, may utilize natural language processing (NLP) libraries such as NLTK, spaCy, or transformer models such as BERT or GPT, which are part of the Hugging Face's Transformers library. The encoder converts the text into a high-dimensional vector that captures the semantic meaning of the geological descriptions.

At block 230, the text embedding is processed by a machine learning model that is specifically trained on pairs of text descriptions and subsurface models to generate subsurface models from text. For example, the text embedding is fed into a Machine Learning Model(s) (124) of FIG. 1, which has been specifically trained on pairs of Text Descriptions (114) and corresponding Subsurface Models (112). The model interprets the text embedding to generate a new subsurface model that matches the described geological features.

Figure 4A:
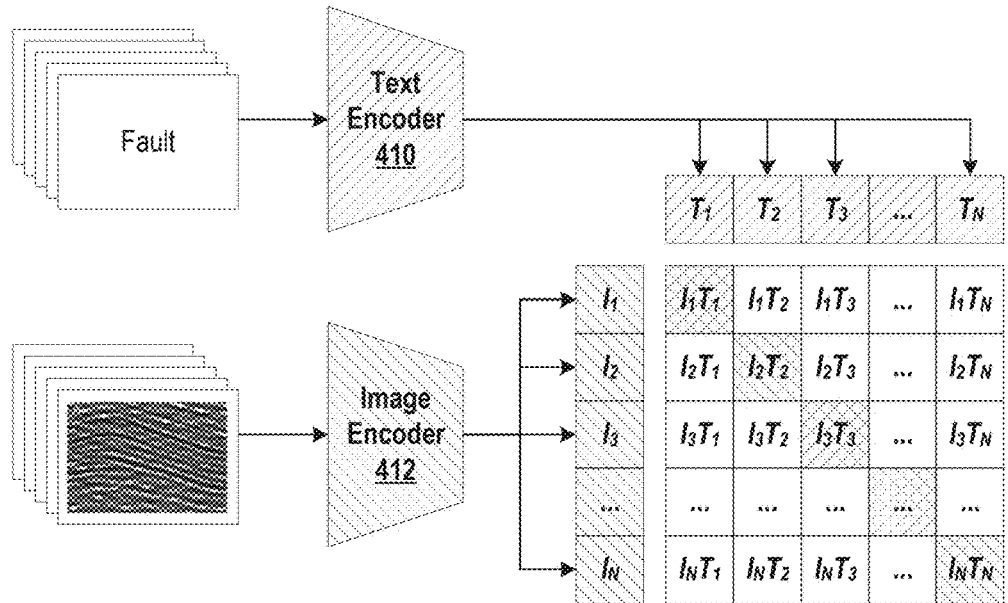
FIGS. 4A and 4B show a diagram of an architecture of a machine learning model designed linking textual semantics and visual representations in accordance with one or more embodiments.

The machine learning model may be a deep neural network architecture, using frameworks like TensorFlow or PyTorch. The model architecture may include a transformer encoder to understand text, CLIP embeddings (e.g., as shown in FIG. 4A) to link text and images, and a dual-resolution diffusion model to progressively remove noise from an initial image based on the text embedding. The model architecture generates high-quality models that align with the textual description. The combination of NLP techniques, pre-trained embeddings, and deep learning enables text-to-image generation. The training of such models may be conducted on high-performance computing resources, leveraging GPUs or TPUs for efficient processing.

In some embodiments, the method may further include training a machine learning system to generate subsurface geological models from textual descriptions. For example, this system may compile a data set of geological models and corresponding text descriptions from source data such as geological surveys, research papers, or databases. A kinematic forward modeling, such as PyNoddy, may be used to generate synthetic geological models, with each model's parameters being automatically documented as text descriptions. The dataset may be managed in a database or a data repository that allows each model to be directly paired with its description.

Continuing with the training example, text descriptions are processed through the text encoder to generate text embeddings. The text encoder converts the collected text descriptions into a numerical vector that is interpretable by the machine learning model. Pre-trained NLP models may be fine-tuned on the geological vocabulary to increase model accuracy. These embeddings serve as the input for the machine learning model's training process.

After encoding the text, the system links each text embedding with its corresponding geological model to form training pairs. The linkage enables the machine learning model to associate specific inputs (text embeddings) with desired outputs (geological models). This association could involve a relational database or a data frame structure where each row represents a pair ensuring that the model has a clear reference between the text description that is received and the geological model that should be reproduced.

With the training pairs established, the machine learning model(s) (124) of FIG. 1 can be trained. The machine learning model(s) use the text embeddings as input and learns to generate the corresponding subsurface models. The objective of the training process is for the model to learn to generate a subsurface model that matches a new, unseen text description. The machine learning model's architecture may include convolutional layers if the output models are image-like or may utilize sequence-to-sequence structures if the models are represented in other structured formats.

The training may be conducted using deep learning techniques, with the machine learning model adjusting its internal parameters to minimize the difference between its outputs and the actual geological models. During training, various techniques like backpropagation and optimization algorithms (e.g., Adam or SGD) may be used to iteratively improve the model's performance.

Continuing with block 240 of FIG. 2, the machine learning model outputs a subsurface model including the subsurface geological feature that corresponds to the text. This subsurface model, which can be subsurface model (134) of FIG. 1, is a digital representation of the subsurface geological features as described by the input text prompt. The subsurface model could be a 2D cross-sectional image, a 3D model, or a multi-dimensional dataset with various geological attributes.

The generated model may be outputted in various formats such as binary files for 3D models (e.g., STL, OBJ), image files (e.g., PNG, JPEG), or specialized geological modeling formats compatible with industry-standard software. Depending on the end-use, this model can be visualized directly within the application, exported for further analysis, or used as input for simulation software.

While the various steps in this flowchart are presented and described sequentially, at least some of the steps may be executed in different orders, may be combined, or omitted, and at least some of the steps may be executed in parallel. Furthermore, the steps may be performed actively or passively.

Figure 3:
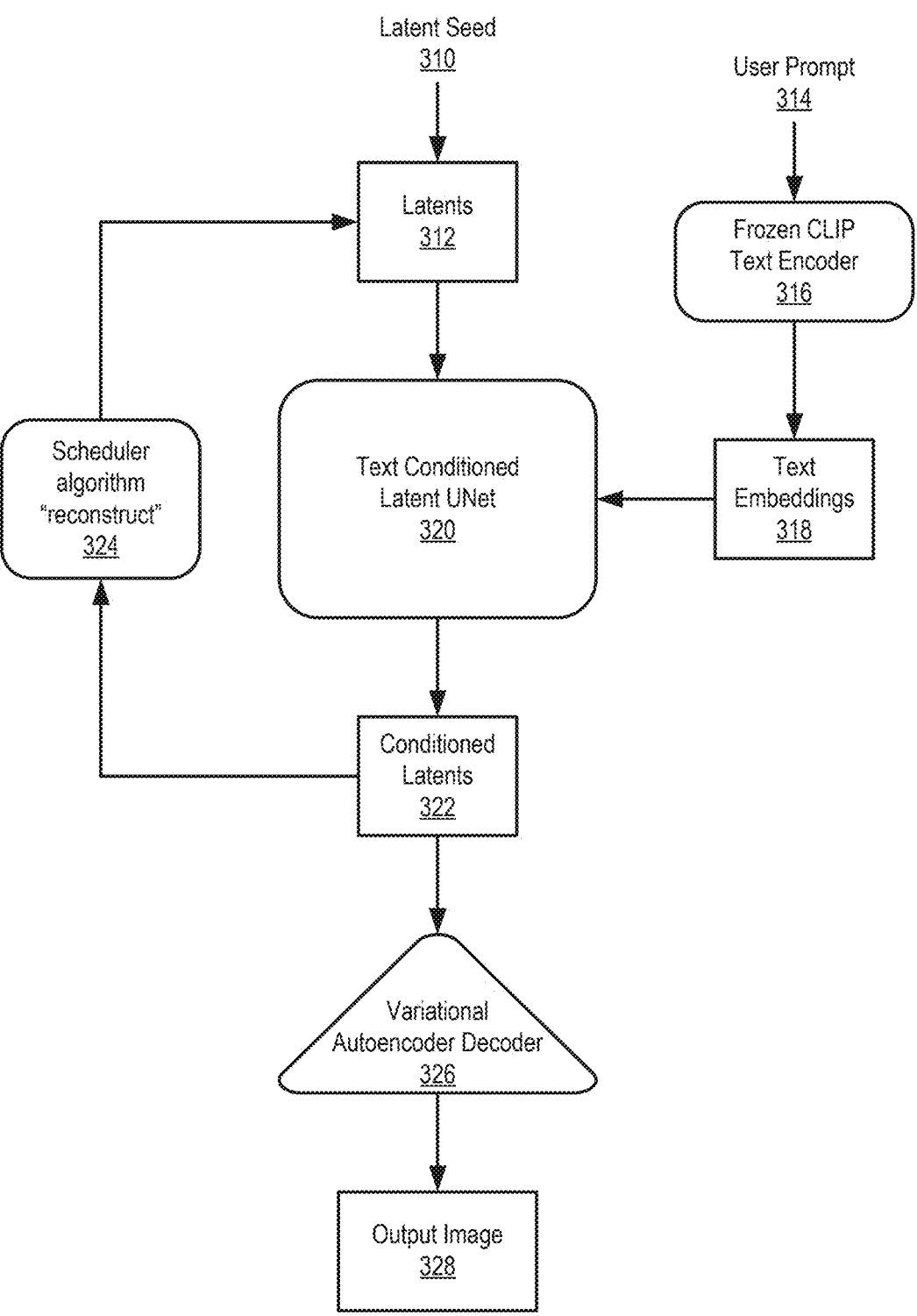
FIG. 3 shows a diagram of an architecture of a machine learning model designed for generating images from textual descriptions in accordance with one or more embodiments.

Turning to FIG. 3, a diagram of an architecture of a machine learning model designed for generating images from textual descriptions is shown according to illustrative embodiments. The architecture illustrated in FIG. 3 can be employed to generate geological and seismic 2D models from a text prompt.

The process begins with a latent seed (310), which may be a vector of Gaussian noise. This random noise is sampled from a normal distribution, notated as N (0,1), representing a mean of 0 and standard deviation of 1. The noise serves as the initial input that the model will refine into an image.

The noise vector is processed to create a grid (e.g., 64×64) of latents (312). Conceptually, the latents are a low-resolution representation of the image that will be generated.

The user's prompt (314) (e.g., "a seismic section with normal fault, low-frequency, high-noise.") is processed by a text encoder (316). The text encoder (316) is "frozen," meaning its weights do not change during the image generation process. The text encoder (316) converts the text prompt into a text embedding (318) (e.g., 77×768 vector), which is a numerical representation capturing the semantic meaning of the prompt.

The latents (312) and the text embeddings (318) are fed into a text-conditioned latent U-Net (320). The U-Net is a type of convolutional neural network that is particularly effective for image segmentation tasks. The U-Net modifies the latents on the text input, generating the conditioned latents (322) that infuse the semantic meaning of the text into the image representation.

A scheduler algorithm (324), which is part of the diffusion process, iteratively refines the conditioned latents. The "reconstruct" is a series of denoising steps in the diffusion process, where the model gradually shifts from noise towards a coherent image.

After several iterations (N scheduler steps), the conditioned latents (322) are processed through a variational autoencoder/decoder (VAE) (326). The VAE (326) is a generative model that supports decoding the latent representation back into image space, increasing the resolution and detail.

The output image (328) is an image (e.g., 512×512) that visually represents the model's interpretation of the textual description provided in the user prompt (314).

Turning to FIG. 4A, a diagram of an architecture of a machine learning model designed linking textual semantics and visual representations is shown according to illustrative embodiments. The architecture illustrated in FIG. 4A can be a Contrastive Language-Image Pretraining (CLIP) architecture.

The CLIP architecture is designed to understand and categorize images based on textual descriptions, linking textual semantics and their visual representations. CLIP is trained on images and their associated captions learning how much a text snippet relates to an image. Rather than predicting a caption given an image, CLIP learns how related any given caption is to an image. Each of the following steps may utilize one or more deep neural networks trained on a large corpus of images and text, allowing the model to generalize from text to images in a way that mimics human visual understanding.

As illustrated in FIG. 4A, the CLIP model starts with contrastive pre-training, which is intended to learn visual concepts from natural language supervision. A text prompt (e.g., "Fault") is fed into a text encoder (410), which transforms it into a series of text embeddings ($T_1$, $T_2$, . . . , $T_N$). These embeddings are high-dimensional vectors that represent the semantic content of the text. A corresponding image (e.g., of the mentioned fault) is processed by an image encoder (412), resulting in a set of image embeddings ($I_1$, $I_2$, . . . , $I_N$).

The CLIP model is trained to align the text embeddings with the correct image embeddings. This alignment is done by maximizing the cosine similarity of the correct text-image pairs ($I_1T_1$, $I_2T_2$, . . . , $I_NT_N$) while minimizing the similarity of incorrect pairs (e.g., $I_1T_2$, $I_2T_3$, etc.).

Figure 4B:
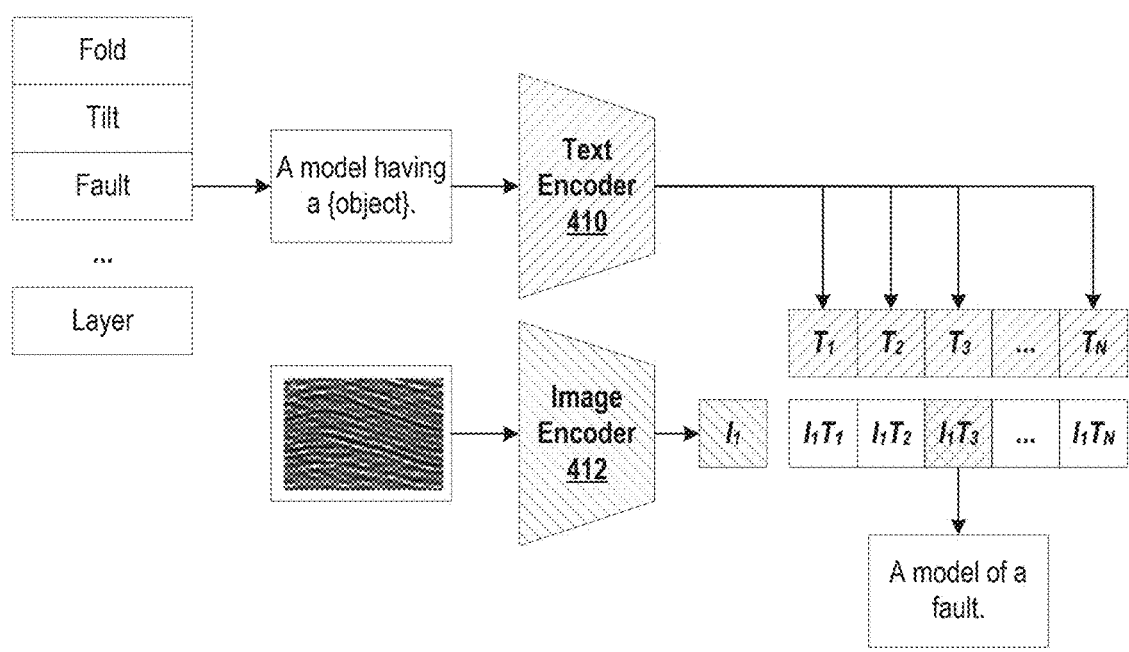

FIG. 4B illustrates an overview of a contrastive language-image pretraining (CLIP) model architecture. The CLIP architecture is designed to understand and categorize images based on textual descriptions, linking textual semantics and their visual representations. CLIP is trained on images and their associated captions, learning how much a text snippet relates to an image. Rather than predicting a caption given an image, CLIP learns how related any given caption is to an image. Each of the following steps may utilize one or more deep neural networks trained on a large corpus of images and text from the internet, allowing the model to generalize from text to images in a way that mimics human visual understanding.

A dataset-specific classifier is created from the labeled images. A set of category labels (fault, tilt, fold, layer, etc.) is encoded into text embeddings using the text encoder, this time with a prompt format like "A model having a [object]." These embeddings function as the "weight" of a linear classifier, where the text embeddings for the dataset labels are directly used to classify images.

When a new image is presented, the image encoder (412) produces image embeddings ($I_1$). The image embeddings are compared to the learned text embeddings ($T_1$, $T_2$, . . . , $T_N$) from the classifier creation phase.

The model predicts the category of the image by finding the text embedding with the highest similarity to the image embedding. For example, if $I_1$ is most similar to the text embedding for "Fault," CLIP predicts that the image is "A model having a fault."

While FIGS. 1, 3, 4A and 4B show a configuration of components, other configurations may be used without departing from the scope of the description. For example, various components may be combined to create a single component. As another example, the functionality performed by a single component may be performed by two or more components.

The following example is for explanatory purposes and not intended to limit the scope of the technology.

Figure 5:
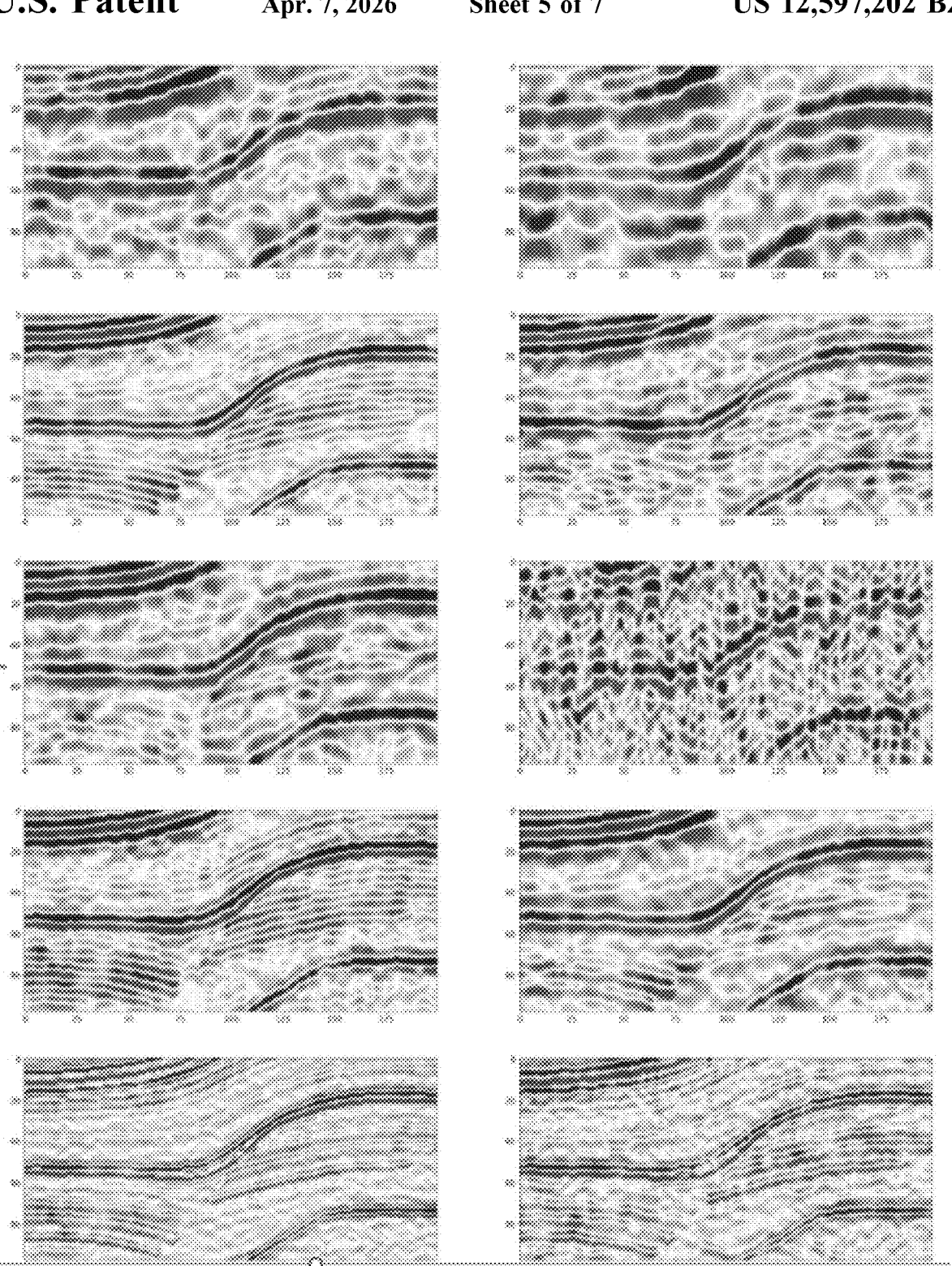
FIG. 5 shows a collection of seismic models that are generated by an image generating MLM in accordance with one or more embodiments.

FIG. 5 is a collection of seismic models that are generated according to illustrative embodiments. The seismic models are examples of subsurface models that are visual representations of subsurface structures generated by the architecture described here in based on a user prompt, e.g., "seismic data imaging compressional anticline trap of different levels of noise, frequency between 30 and 200 Hz."

The seismic models may be used to interpret the Earth's subsurface features by displaying variations in the seismic properties of different geological layers. A compressional anticline trap is a type of structural trap in the Earth's subsurface formed by the up-arching of geological layers into a dome-like fold. The seismic models are illustrated with varying noise levels and a specified frequency range.

Each seismic model in the series show a cross-section of a hypothetical subsurface, based on the seismic model's interpretation of the user prompt. The different patterns and variations within the images may represent various geological layers and/or different rock properties. The continuous lines or waves represent the seismic reflections from interfaces between layers of contrasting seismic velocities. Different polarities of the seismic reflection, indicating changes in rock type or fluid content may be denoted by distinct colors in the seismic models. The variation in frequency and noise levels across the seismic models can be used to simulate different quality levels of seismic data acquisition or processing.

The seismic models exhibit variations in clarity and continuity, representing various levels of noise that can arise from various sources such as environmental factors, equipment limitations, or processing artifacts. Noise obscures the seismic signal and causing challenges to interpret the geological features accurately. As illustrated, the noise may simulate signal degradation that effect clarity of the anticlinal structure to varying degrees. For example, some seismic models show clear and continuous anticlinal shapes, while others are more disrupted, with the anticlinal feature being less discernible due to the overlying noise.

Figure 6:
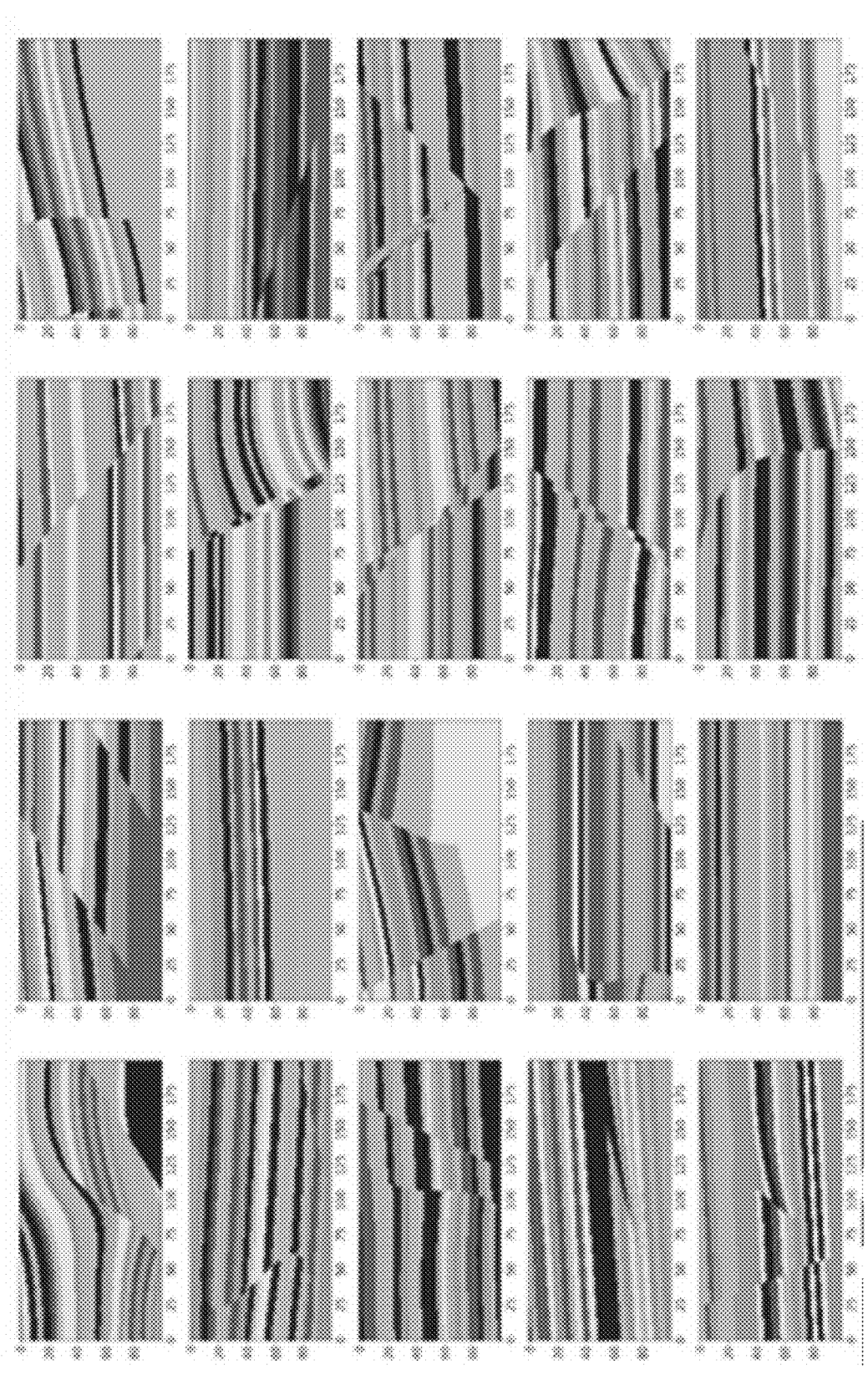
FIG. 6 shows a collection of geologic models that are generated by an image generating MLM in accordance with one or more embodiments.

FIG. 6 is a collection of subsurface models that are generated by an image generating machine learning model according to illustrative embodiments. The subsurface models are visual representations of subsurface structures generated by the architecture described here in based on a user prompt, e.g., "2D geological section with two faults and a fold."

The subsurface models represent cross-sections of the Earth's subsurface, where distinct colors correspond to distinct geological layers or lithologies. Distinct colors may represent different rock types or the properties of these rocks, such as grain size, composition, or age.

As shown, the subsurface models display horizontal and tilted layers, indicating sequences of sedimentary deposition. The stratification is generally regular, with consistent layering that reflects a geological history of sequential deposition.

The subsurface models are generated consistent with the user prompt. For example, the subsurface models show two distinct faults, represented by the visible discontinuities or offsets in the layering where the continuation of a layer is broken and displaced. A fold structure is represented by the curvature of the layers into an arch-like shape or a trough without further details specified in the prompt, the fold could be an anticline (upward-arching fold), a syncline (downward-arching fold), or a combination of both in the form of a fold series.

Embodiments may be implemented on a computing system specifically designed to achieve an improved technological result. When implemented in a computing system, the features and elements of the disclosure provide a technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 7A, the computing system (700) may include one or more computer processors (702), non-persistent storage (704), persistent storage (706), a communication interface (712) (e.g., Bluetooth interface, infrared interface, network interface, optical interface, etc.), and numerous other elements and functionalities that implement the features and elements of the disclosure. The computer processor(s) (702) may be an integrated circuit for processing instructions. The computer processor(s) may be one or more cores or micro-cores of a processor. The computer processor(s) (702) includes one or more processors. The one or more processors may include a central processing unit (CPU), a graphics processing unit (GPU), a tensor processing unit (TPU), combinations thereof, etc.

The input devices (710) may include a touchscreen, keyboard, mouse, microphone, touchpad, electronic pen, or any other type of input device. The input devices (710) may receive inputs from a user that are responsive to data and messages presented by the output devices (708). The inputs may include text input, audio input, video input, etc., which may be processed and transmitted by the computing system (700) in accordance with the disclosure. The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the output devices (708) may include a display device, a printer, external storage, or any other output device. One or more of the output devices may be the same or different from the input device(s). The input and output device(s) may be locally or remotely connected to the computer processor(s) (702). Many diverse types of computing systems exist, and the aforementioned input and output device(s) may take other forms. The output devices (708) may display data and messages that are transmitted and received by the computing system (700). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

The nodes (e.g., node X (722), node Y (724)) in the network (720) may be configured to provide services for a client device (726), including receiving requests and transmitting responses to the client device (726). For example, the nodes may be part of a cloud computing system. The client device (726) may be a computing system, such as the computing system shown in FIG. 7A. Further, the client device (726) may include and/or perform at least a portion of one or more embodiments.

The computing system of FIG. 7A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited by the attached claims.

What is claimed is:

1. A method for generating a subsurface model by an image generating machine learning model (MLM), comprising:

receiving a text prompt describing a subsurface geological feature;

receiving a latent seed comprising a noise vector;

processing the noise vector to create a grid of latents, the grid of latents comprising a low-resolution image representation of the subsurface model;

encoding, by a text encoder having frozen weights, the text prompt into a text embedding;

processing the text embedding and the grid of latents by the image generating MLM specifically trained on pairs of text descriptions and existing subsurface models to generate subsurface models from text, wherein the image generating MLM modifies the grid of latents on the text prompt to generate conditioned latents that infuse a semantic meaning of the text prompt into the low-resolution image representation;

performing, via the image generating MLM, a diffusion process using a scheduler algorithm configured to iteratively refine the conditioned latents, the performing the diffusion process including a reconstruction comprising a series of denoising steps that gradually reduce noise in the low-resolution image representation to shift the low-resolution image representation into a coherent image; and outputting, by the image generating MLM, the subsurface model comprising a model of the subsurface geological feature that corresponds to the text prompt, wherein the outputting the subsurface model comprises displaying the coherent image including variations in seismic properties of layers in the subsurface geological feature, the variations comprising the noise and a frequency.

2. The method of claim 1, wherein the text prompt begins with a template format including classifications of geological features.

3. The method of claim 1, wherein the text prompt specifies at least one descriptive feature selected from a group consisting of a fault, a fold, a tilt, and combinations thereof.

4. The method of claim 1, wherein the image generating MLM is trained using data pairs comprising a geological 2D model and a seismic 2D model with associated text descriptions.

5. The method of claim 1, further comprising:

compiling a dataset of geological models and corresponding text descriptions;

processing the text descriptions through the text encoder to generate corresponding text embeddings;

associating the corresponding text embeddings with the geological models to create training pairs; and training the image generating MLM using the training pairs to generate the subsurface models generated from text.

6. The method of claim 1, further comprising:

processing the text prompt by a contrastive language-image pretraining model to relate textual semantics to visual representations.

7. The method of claim 1, wherein the image generating MLM is trained using kinematically consistent geological models generated by a kinematic forward modeling tool.

8. The method of claim 1, further comprising:

training a machine learning algorithm using the subsurface model.

9. The method of claim 1, further comprising:

automatically describing seismic data using the subsurface model.

10. The method of claim 1, further comprising:

probabilistically generating the subsurface model to include stochastic variations in geological features.

11. The method of claim 1, further comprising:

visualizing the subsurface model using a 3D visualization tool.

12. The method of claim 1, further comprising modifying the subsurface model based on additional input from a domain expert.

13. The method of claim 1, wherein the image generating MLM is incorporated into a standalone tool for end-users to generate the subsurface models.

14. The method of claim 1, wherein:

receiving the text prompt comprises receiving the text prompt via an application programming interface endpoint; and the text prompt is formatted in at least one of JavaScript Object Notation or Extensible Markup Language.

15. The method of claim 1, wherein the noise vector comprises a vector of Gaussian noise.

16. The method of claim 1, further comprising processing the conditioned latents through a variational autoencoder/decoder (VAE) comprising a generative model that supports decoding the low-resolution image representation into an image space.

17. A system comprising:

a computer processor; and a non-transitory computer readable storage medium storing program code, which when executed by the computer processor, performs a plurality of operations comprising:

receiving a text prompt describing a subsurface geological feature;

receiving a latent seed comprising a noise vector;

processing the noise vector to create a grid of latents, the grid of latents comprising a low-resolution image representation of a subsurface model;

encoding, by a text encoder having frozen weights, the text prompt into a text embedding;

processing the text embedding and the grid of latents by an image generating machine learning model (MLM) specifically trained on pairs of text descriptions and existing subsurface models to generate subsurface models from text, wherein the image generating MLM modifies the grid of latents on the text prompt to generate conditioned latents that infuse a semantic meaning of the text prompt into the low-resolution image representation;

performing, via the image generating MLM, a diffusion process using a scheduler algorithm configured to iteratively refine the conditioned latents, the performing the diffusion process including a reconstruction comprising a series of denoising steps that gradually reduce noise in the low-resolution image representation to shift the low-resolution image representation into a coherent image; and outputting, by the image generating MLM, the subsurface model of the subsurface models generated from the text, the subsurface model comprising a model of the subsurface geological feature that corresponds to the text prompt, wherein the outputting the subsurface model comprises displaying the coherent image including variations in seismic properties of layers in the subsurface geological feature, the variations comprising the noise and a frequency.

18. The system of claim 17, wherein the text prompt begins with a template format including classifications of geological features.

19. The system of claim 17, wherein the text prompt specifies at least one descriptive feature selected from a group consisting of a fault, a fold, a tilt, and combinations thereof.

20. The system of claim 17, wherein the image generating MLM is trained using data pairs comprising a geological 2D model and a seismic 2D model with associated text descriptions.

21. The system of claim 17, wherein the program code, when executed by the computer processor, performs further operations comprising:

compiling a dataset of geological models and corresponding text descriptions;

processing the text descriptions through the text encoder to generate corresponding text embeddings;

associating the corresponding text embeddings with the geological models to create training pairs; and training the image generating MLM using the training pairs to generate the subsurface models generated from text.

22. A computer program product comprising a non-transitory computer readable storage medium storing program code, which when executed by a computer processor, performs operations comprising:

receiving a text prompt describing a subsurface geological feature;

receiving a latent seed comprising a noise vector;

processing the noise vector to create a grid of latents, the grid of latents comprising a low-resolution image representation of a subsurface model;

encoding, by a text encoder having frozen weights, the text prompt into a text embedding;

processing the text embedding and the grid of latents by an image generating machine learning model (MLM) specifically trained on pairs of text descriptions and existing subsurface models to generate subsurface models from text, wherein the image generating MLM modifies the grid of latents on the text prompt to generate conditioned latents that infuse a semantic meaning of the text prompt into the low-resolution image representation;

performing, via the image generating MLM, a diffusion process using a scheduler algorithm configured to iteratively refine the conditioned latents, the performing the diffusion process including a reconstruction comprising a series of denoising steps that gradually reduce noise in the low-resolution image representation to shift the low-resolution image representation into a coherent image; and outputting, by the image generating MLM, a subsurface model of the subsurface models generated from text, the subsurface model comprising a model of the subsurface geological feature that corresponds to the text prompt, wherein the outputting the subsurface model comprises displaying the coherent image including variations in seismic properties of layers in the subsurface geological feature, the variations comprising the noise and a frequency.

23. The computer program product of claim 22, wherein the program code, when executed by the computer processor, performs further operations comprising:

compiling a dataset of geological models and corresponding text descriptions;

processing the text descriptions through the text encoder to generate corresponding text embeddings;

associating the corresponding text embeddings with the geological models to create training pairs; and training the image generating MLM using the training pairs to generate the subsurface models generated from text.

* * * * *